(12) United States Patent
England et al.

(10) Patent No.: US 7,976,787 B2
(45) Date of Patent: *Jul. 12, 2011

(54) FUEL CELL REFORMER

(75) Inventors: Diane M. England, Bloomfield, NY (US); Sean M. Kelly, Pittsford, NY (US)

(73) Assignee: Delphi Technologies, Inc., Troy, MI (US)

( * ) Notice: Subject to any disclaimer, the term of this patent is extended or adjusted under 35 U.S.C. 154(b) by 281 days.

This patent is subject to a terminal disclaimer.

(21) Appl. No.: 12/229,179

(22) Filed: Aug. 20, 2008

(65) Prior Publication Data
US 2010/0043289 A1    Feb. 25, 2010

(51) Int. Cl.
*B01J 8/02* (2006.01)
(52) U.S. Cl. ........ 422/211; 422/196; 422/197; 422/193; 422/194; 422/222; 48/127.9; 48/61
(58) Field of Classification Search .................. 422/211, 422/196–197, 193–194, 222; 48/127.9, 61
See application file for complete search history.

(56) References Cited

U.S. PATENT DOCUMENTS

| | | | |
|---|---|---|---|
| 5,876,469 | A | 3/1999 | Moriya et al. |
| 6,537,351 | B2 | 3/2003 | Margiott et al. |
| 6,592,787 | B2 | 7/2003 | Pickrell et al. |
| 6,746,650 | B1 | 6/2004 | Lesieur |
| 6,759,016 | B2 | 7/2004 | Sederquist et al. |
| 6,797,244 | B1 | 9/2004 | Lesieur |
| 7,083,663 | B2 | 8/2006 | Shih et al. |
| 2002/0136677 | A1 | 9/2002 | Sederquist et al. |
| 2007/0144828 | A1 | 6/2007 | Galligan |
| 2007/0175094 | A1* | 8/2007 | Reinke et al. ............... 48/127.9 |

FOREIGN PATENT DOCUMENTS

EP    2022558    2/2009

OTHER PUBLICATIONS

EP Search Report dated Jan. 22, 2010.

* cited by examiner

*Primary Examiner* — Kaity V. Handal
(74) *Attorney, Agent, or Firm* — Thomas N. Twomey

(57) ABSTRACT

An improved multiple-tube catalytic reformer comprising a tubular body containing a radiator core having a plurality of longitudinal cells for low-pressure flow-through of combustion gases, the core being formed preferably either by winding of corrugated metal or as an extruded metal monolith. A plurality of reformer tubes, preferably non-cylindrical, containing hydrocarbon catalyst are arrayed in longitudinal openings within the radiator core and preferably are brazed thereto to maximize heat transfer from the radiator core to the reformer tubes. During manufacture, the metal radiator core is economically bored by laser cutting to form the openings to admit the reformer tubes for brazing. Preferably, the reformer tubes are numbered, sized, shaped, and arrayed to minimize the longest conduction path in the radiator core to the center of any reformer tube.

15 Claims, 2 Drawing Sheets

FUEL CELL REFORMER

RELATIONSHIP TO GOVERNMENT CONTRACTS

The present invention was supported in part by a US Government Contract, No. DE-FC26-02NT41246. The United States Government may have rights in the present invention.

TECHNICAL FIELD

The present invention relates to catalytic reformers for reforming hydrocarbon fuels; more particularly, to catalytic reformers requiring the application of heat to the catalyst; and most particularly, to an improved tubular reformer conduit having increased radial heat transfer from a radiator core to a reformer core.

BACKGROUND OF THE INVENTION

Hydrocarbon fuel reformers are well known, especially in the fuel cell arts wherein a hydrogen-rich reformate is generated from a hydrocarbon input fuel for consumption as a fuel by a downstream fuel cell system comprising, for example, a solid oxide fuel cell (SOFC) stack. A prior art reformer typically includes a reforming bed formed of a porous foam material having a washcoat applied to the surfaces of the foam and a precious-metal catalyst applied to the washcoat. The hydrocarbon fuel, when passed through the reforming bed in the presence of oxygen and/or steam, becomes oxidized to molecular hydrogen and carbon monoxide, both of which are excellent fuels for an SOFC stack.

Reformers are divided generally into two categories: exothermic and endothermic. In exothermic reforming, the only oxidant typically is oxygen derived from air, and the exothermic oxidation reaction provides sufficient thermal energy to maintain the reaction at the elevated temperatures required for reforming. In endothermic reforming, the oxidant typically is water vapor but may also include oxygen from air. Because the overall reaction is endothermic, an outside source of heat must be provided to the reformer, which, in the case of a reformer coupled to an SOFC, typically is accomplished by burning either anode stack exhaust gas which is still rich in hydrogen or the flow of original hydrocarbon fuel.

In either case, reforming cannot commence until the catalyst is raised to a temperature typically greater than about 550° C.; thus, a reformer/SOFC fuel cell system cannot begin generating electricity until both the reformer and the fuel cell stack are at elevated temperature.

It is known in the art of reformer start-up to provide to the reformer a combustible is fuel/air mixture of the hydrocarbon fuel to be reformed and to ignite the flowing mixture for several seconds, passing the hot combustion gases through the reformer to heat the catalyst. In earlier reformers (particularly exothermic reformers), the combustion gases were passed directly through the catalytic bed before ignition was terminated and reforming started; however, in more recent reformers, the combustion gases are passed around the catalyst bed which is contained in tubes that separate the bed from the gases. Fuel/air mixture can pass through the catalyst bed while the temperature is being increased to the reforming temperature. And, indeed, in endothermic reforming continuous exogenous heating of the catalyst bed may be necessary.

A well-known challenge in the reformer art is how to promote both rapid and efficient heat transfer from the hot combustion gases to the catalyst bed. Inefficient transfer causes longer heating times at start-up, which is wasteful of fuel and dissatisfies the fuel cell user. Further, inefficient transfer increases the heat lost to the system in the exhaust gas and thus is also wasteful of fuel.

U.S. Pat. No. 6,759,016 B2 discloses to dispose a plurality of catalyst tubes within a plurality of burner tubes to define a narrow annular gap therebetween, and to pass the burner combustion gases through the annular gap to heat the catalyst tubes. Although this arrangement provides a relatively high surface-to-volume ratio for the combustion gases to the catalyst tubes, heat transfer rate is still limited by the available surface area of the catalyst tubes.

U.S. Pat. No. 5,876,469 discloses to arrange a porous media composed of ceramic foams around the catalyst tubes. Flue gas is passed through the porous media which is heated thereby and transfers heat to the catalyst tubes via re-radiation and conduction. A problem with this arrangement is that conduction is the most efficient means of heat transfer but requires a conductive path, and the porous media is only fractionally in conductive contact with the catalyst tubes. Further, a foam structure has an inherently long conductive path for heat migration and therefore is effectively an insulator, in an application that requires just the opposite. Further, even in open cell foams, the tortuous pathway for gas passing through creates an objectionably large pressure drop for combustion gases.

What is needed in the art is an improved multiple-tube catalytic reformer wherein the reforming domains are separate from the combustive heating domains, and wherein the materials and construction of each domain are optimized for the different functions to be performed.

It is a principal object of the present invention to improve the effectiveness and reduce the cost of manufacturing of a CPOx catalytic hydrocarbon reformer.

SUMMARY OF THE INVENTION

Briefly described, an improved multiple-tube CPOx catalytic reformer comprises a tubular body containing a radiator core having a plurality of longitudinal cells for low-pressure flow-through of combustion gases, formed preferably either by winding of corrugated metal or as an extruded metal monolith. A plurality of reformer tubes, preferably non-cylindrical, containing hydrocarbon catalysts are arrayed within the radiator core and preferably are brazed thereto to maximize heat transfer from the radiator core to the reformer tubes. During manufacture, the metal radiator core is economically bored by laser cutting to form openings to admit the reformer tubes for brazing. Preferably, the reformer tubes are numbered, sized, shaped, and arrayed to minimize the longest conduction path in the radiator core to the center of any reformer tube.

BRIEF DESCRIPTION OF THE DRAWINGS

The present invention will now be described, by way of example, with reference to the accompanying drawings, in which.

The exemplifications set out herein illustrate currently-preferred embodiments of the invention, and such exemplifications are not to be construed as limiting the scope of the invention in any manner.

DESCRIPTION OF THE PREFERRED EMBODIMENTS

Figure 1:
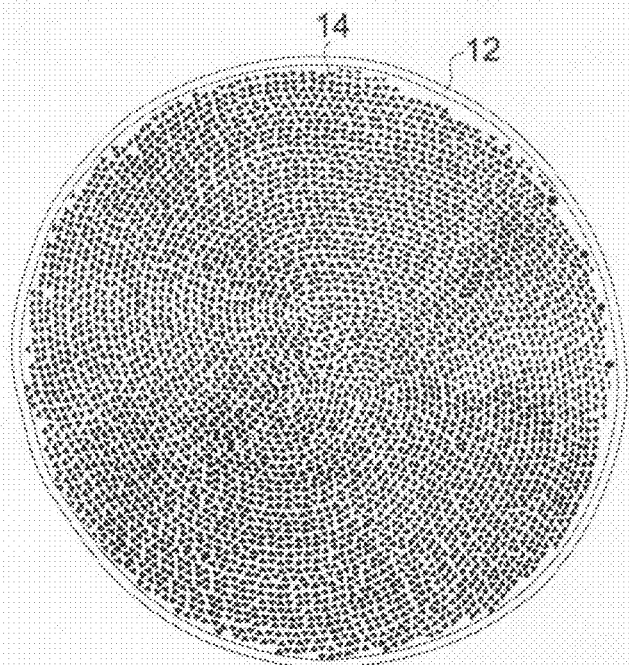
FIG. 1 is a front elevational view of a subassembly comprising a wound radiator core in a reformer shell.
Figure 2:
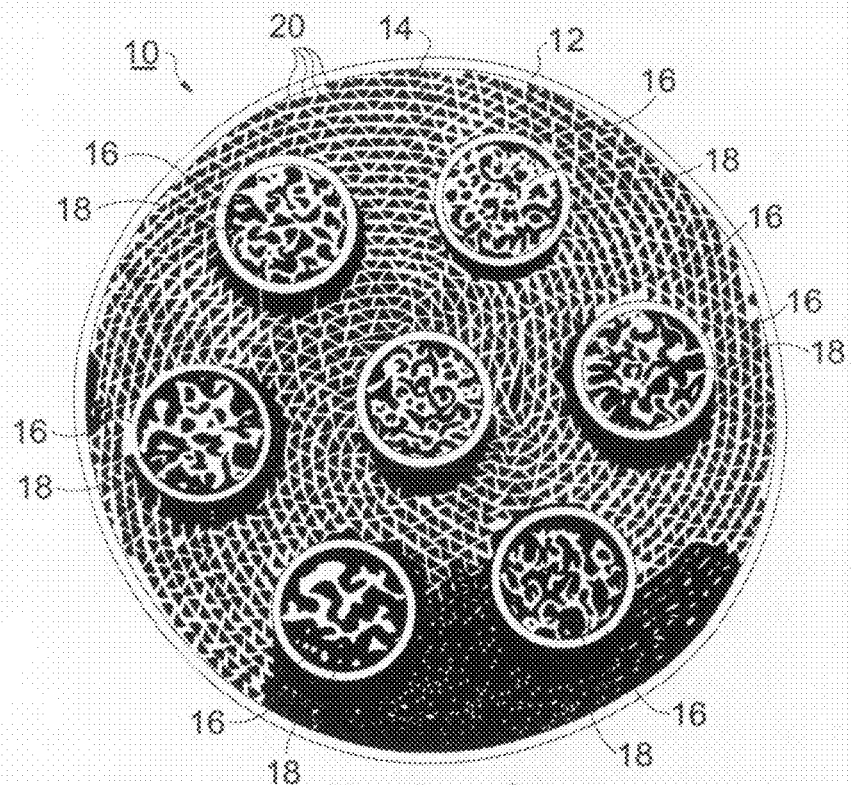
FIG. 2 is a front elevational view of a first embodiment of a hydrocarbon reformer in accordance with the present invention.

Referring to FIGS. 1 and 2, a first embodiment of a hydrocarbon reformer 10 in accordance with the present invention includes an outer housing or shell 12, a radiator core 14 disposed within shell 12, a plurality of reformer tubes 16 arrayed within core 14, and a catalytically-active open-cell metal foam core 18 disposed within each reformer tube 16. Preferably, radiator core 14 is brazed (brazing not visible in FIG. 1) to reformer tubes 16 to improve heat transfer therebetween.

In use, hot gases, such as combusted fuel gases, are passed through radiator core 14, transferring heat to radiator core 14. A fuel/air mixture to be reformed is passed through metal foam core 16. Heat from radiator core 14 is conducted through the brazing into tubes 16 and thence into metal foam core 18 to accelerate reforming. Heat is also transferred by radiation between core 14 and tubes 16. Obviously, of course, heat may be transferred in the reverse direction if desired by passing a coolant through radiator core 14.

In the prior art, radiator core 14 is formed of an open-cell metal foam that limits, as described above, the conduction of heat between core 14 and tubes 16. In the present invention, core 14 comprises a plurality of flow cells 20 extending longitudinally through shell 12 and having a large surface contact area and short conductive path for efficient heat transfer from the hot combustor gases to radiator core 14. As shown in FIG. 2, radiator core 14 may be formed economically as by winding of one or more corrugated metal sheets; alternatively, core 14 may be formed as an extruded metal monolith. The metal of radiator core 14 and reformer tubes 16 should be at least a stainless steel or equivalent, capable of withstanding the temperatures of fuel combustion gases. Presently preferred materials are Inconel 625 and Haynes 230, having high coefficients of thermal conductivity.

Nickel brazing alloys such as BNi-5 or BNi-9 are suitable for brazing radiator core 14 to reformer tubes 16.

Reformer foam cores 18 are formed preferably of an iron-chromium alloy, for example, a FeCrAlloy foam matrix such as is disclosed in US Patent Application Publication No. 2007/0144828, published Jun. 28, 2007. Foam cores 18 are treated with a washcoat and precious metal catalyst as is well known in the prior art of hydrocarbon reforming.

Figure 3:
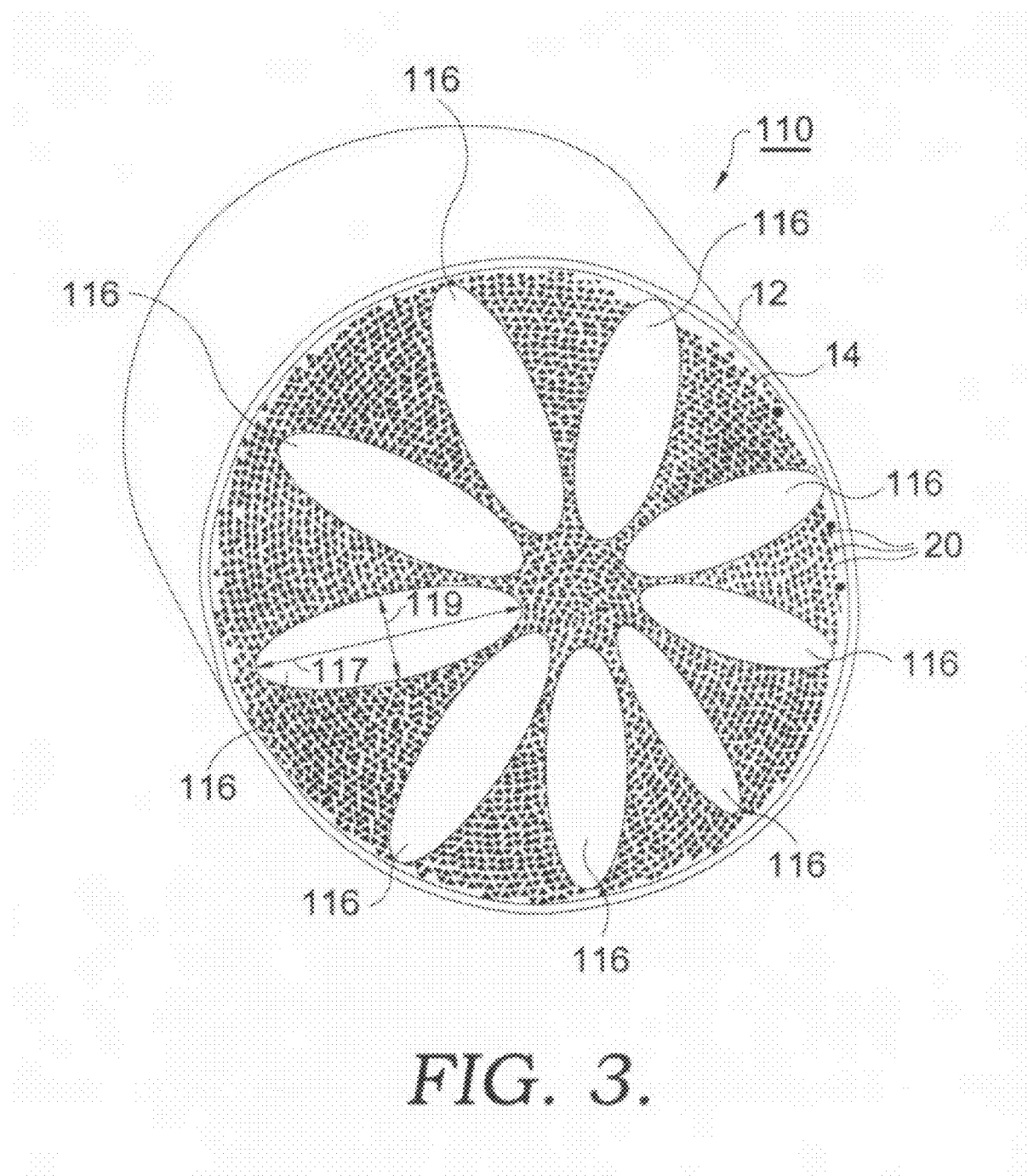
FIG. 3 is a front isometric view of a second and preferred embodiment in accordance with the present invention.

Referring to FIG. 3, a currently-preferred embodiment 110 is shown. The number and shape of reformer tubes 116, thickness of tube walls, diameter of reformer tubes 116 relative to the diameter of shell 12, and areal density of cells 20 may all be varied and optimized within the scope of the present invention to meet any desired combination of flow rate of combustion gases and flow rate of reforming mixture. In general, an array such as is shown in second embodiment 110 in FIG. 3 is preferable, wherein tubes 116 are non-cylindrical, each having a major axis 117 and a minor axis 119. Tubes 116 may be but are not necessarily elliptical in cross-sectional shape. Major axis 117 may be arranged radially of radiator core 14. Preferably, a cylindrical central or axial tube is omitted; experience has shown that a central tube tends to run somewhat colder than the other tubes and thus is prone to carbon buildup.

Some benefits of the arrangement shown in embodiment 110 are:

a) the pressure drop of the reforming path through the reformer tubes is reduced: the measured pressure drop of reformer 10 is about 2.5 kPa, whereas that of reformer 110 is about 0.5 kPa;

b) the amount of catalyst that can be presented to the air/fuel mixture is increased; preferably, the total cross-sectional area of metal foam matrix (omitted from FIG. 3) as related to total cross-sectional area of shell 12 is greater than 50% and preferably approaches 70%;

c) the maximum length of conduction path from within the radiator core 14 to the center of each metal foam matrix is minimized; tubes 116 have 4.4 times the potential heat transfer of corresponding cylindrical tubes 16; and d) the carbon-forming central tube is omitted.

A method for forming a reformer 10,110 in accordance with the present invention includes the step of forming longitudinal openings in radiator core 14 for receiving reformer tubes 16,116. In the prior art, this step has been extremely difficult and costly when attempted either by mechanical boring or by wire EDM of radiator core 14. In the present invention, this step is accomplished easily and economically by cutting with a high-powered laser.

A first benefit of this cutting method is that the cut surface of the radiator core is partially fused, which helps to retain the integrity of the radiator core in the subsequent steps of inserting the reformer tubes into the longitudinal openings and brazing the reformer tubes to the radiator core, especially for a wound-metal core.

A second and very important benefit is that openings of any desired cross-sectional shape may be formed; for example, oval as in FIG. 3, whereas only cylindrical openings may be formed by prior art rotary machining processes.

In a comparison of cutting time required for generating seven openings in an Inconel 625 wound radiator core, wire EDM cutting required about 650 minutes, whereas laser cutting required only about 14 minutes. Thus, a reformer core can be much more economically fabricated in accordance with the present invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A catalytic hydrocarbon fuel reformer for generating a hydrogen-rich reformate from a hydrocarbon input fuel, comprising:

a) a radiator core having a plurality of longitudinal cells and an array of longitudinal openings;

b) a plurality of reformer tubes disposed within said array of longitudinal openings; and c) a metal foam matrix disposed within each of said reformer tubes and having catalytic properties for generating said hydrogen-rich reformate from said input fuel.

2. A reformer in accordance with claim 1 wherein said radiator core is selected from the group consisting of wound corrugated metal core and extruded metal monolith core.

3. A reformer in accordance with claim 1 wherein said at least one of said radiator core and said reformer tubes is formed of a metal alloy.

4. A reformer in accordance with claim 3 wherein said metal alloy is selected from the group consisting of Inconel 625 and Haynes 230.

5. A reformer in accordance with claim 1 wherein said metal foam matrix is formed of a metal alloy.

6. A reformer in accordance with claim 5 wherein said alloy is FeCrAlloy.

7. A reformer in accordance with claim 1 wherein said reformer tubes are brazed in said longitudinal openings to said radiator core.

8. A reformer in accordance with claim 7 wherein said braze is selected from the group consisting of BNi-5 and BNi-9.

9. A reformer in accordance with claim 1 further comprising a shell surrounding said radiator core.

10. A reformer in accordance with claim 9 wherein the total cross-sectional area of said metal foam matrix as related to the total cross-sectional area of said shell is greater than about 50%.

11. A reformer in accordance with claim 9 wherein the total cross-sectional area of said metal foam matrix as related to the total cross-sectional area of said shell is about 70%.

12. A reformer in accordance with claim 1 wherein said openings and said reformer tubes are non-cylindrical.

13. A reformer in accordance with claim 12 wherein said reformer tubes each have a major and a minor cross-sectional axis.

14. A reformer in accordance with claim 13 wherein said major cross-sectional axis is aligned radially of said radiator core.

15. A reformer in accordance with claim 13 wherein said reformer tubes are elliptical in cross-sectional shape.

* * * * *